MARIEN GOULD, OF CHICAGO, ILLINOIS.

Letters Patent No. 84,820, dated December 8, 1868.

IMPROVED ROOFING-COMPOSITION.

The Schedule referred to in these Letters Patent and making part of the same.

*To all whom it may concern:*

Be it known that I, MARIEN GOULD, of Chicago, in the county of Cook, and State of Illinois, have invented an Improved Roofing-Compound; and I do hereby declare that the following is a full, clear, and exact description thereof, reference being had to the ingredients herein named, and to the manner in which they are compounded.

To one gallon of common coal-tar, I add ten pounds of fine sand, two ounces of pine-tar, one-half ounce of whale or train-oil, and one ounce of japan varnish. These ingredients are put in any suitable vessel, and thoroughly incorporated, when they are subjected to about a boiling-heat. The compound is then ready to put on the felt.

The coal-tar, sand, and pine-tar have been used in roofing-compounds, and consequently I make no claim to novelty in their combined use, but use them as the base or more solid substance with the other ingredients herein named.

I am fully apprised that lard and lard-oil have been used in roofing-compounds, to prevent them from drying too rapidly, and that, so far as this object alone is concerned, either one will partially answer the purpose; but as oleine is the liquid part of lard and train-oil, and as the latter is composed of about one-fourth more of this substance than lard, it is therefore much the best; and, besides this quality, it contains a small quantity of gelatine, derived from the sinewy parts of fish, which is valuable as a cement, when it is used with the other ingredients named.

Experiments made with some lard-oils prove that they are manufactured of such ingredients as to be positively injurious to the other ingredients mentioned, destroying their cohesive attraction, and rendering a roof worthless; but as whale or train-oil is always to be found in nearly the same chemical condition, no difficulty is experienced in its use.

Common japan varnish (black) is composed of about eight ounces of burnt umber, five ounces of asphaltum, ten ounces of lamp-black, one-half gallon of turpentine, to one gallon of boiled linseed-oil.

The peculiar nature of this varnish is quite well understood, especially in its usual application, but when it is combined with the other ingredients, it forms a chemical union, and produces a cement which is very hard and durable, and makes a roof which is water and fire-proof.

Having thus described my invention,

What I claim, and desire to secure by Letters Patent of the United States, is—

The combination of the ingredients herein named, compounded substantially as and for the purpose specified.

MARIEN GOULD.

Witnesses:
GEO. L. CHAPIN,
EDGAR E. GIBSON.